United States Patent
Jørgensen et al.

(10) Patent No.: US 8,213,654 B2
(45) Date of Patent: Jul. 3, 2012

(54) IN THE EAR AUDIO DEVICE AND METHOD FOR FASTENING AN ELECTRONIC MODULE IN A CAVITY IN A CUSTOM MADE SHELL PART FOR AN IN THE EAR AUDIO DEVICE

(75) Inventors: Bjarke D. Jørgensen, Smørum (DK); Mads G. Andersen, Smørum (DK)

(73) Assignee: Oticon A/S, Smørum (DK)

( * ) Notice: Subject to any disclaimer, the term of this patent is extended or adjusted under 35 U.S.C. 154(b) by 1285 days.

(21) Appl. No.: 11/717,635

(22) Filed: Mar. 14, 2007

(65) Prior Publication Data
US 2007/0223767 A1 Sep. 27, 2007

(30) Foreign Application Priority Data

Mar. 23, 2006 (EP) .................................... 06111621

(51) Int. Cl.
*H04R 25/00* (2006.01)
(52) U.S. Cl. .................. 381/322; 381/328; 181/129
(58) Field of Classification Search .................. 381/322, 381/323, 324, 328, 60, 380; 181/129, 130
See application file for complete search history.

(56) References Cited

U.S. PATENT DOCUMENTS

| 4,870,688 A * | 9/1989 | Voroba et al. ................ 381/60 |
| 6,430,296 B1 * | 8/2002 | Olsen ........................... 381/322 |
| 2004/0258264 A1 | 12/2004 | Jorgensen et al. |

FOREIGN PATENT DOCUMENTS

| WO | 02071794 | 9/2002 |
| WO | 2005004530 | 1/2005 |

* cited by examiner

*Primary Examiner* — Curtis Kuntz
*Assistant Examiner* — Sunita Joshi
(74) *Attorney, Agent, or Firm* — Dykema Gossett PLLC

(57) ABSTRACT

An in-the-ear audio device includes a custom made shell part which fits into the ear canal of a user and a pre-fabricated module part, the custom made part having a cavity with an opening for receiving the module. The cavity is partially bounded by two opposed, substantially parallel internal walls of the shell part which are spaced a distance which will allow two external, substantially parallel sides of the module to slide into the space between the two walls. Recesses and projections which extend in an arc on the walls and on the sides are provided such that the module may be inserted into the cavity between the two walls by a pivotal movement, with the projections at each side sliding in respective recesses.

9 Claims, 7 Drawing Sheets

IN THE EAR AUDIO DEVICE AND METHOD FOR FASTENING AN ELECTRONIC MODULE IN A CAVITY IN A CUSTOM MADE SHELL PART FOR AN IN THE EAR AUDIO DEVICE

AREA OF THE INVENTION

The invention regards an audio device wherein an electronic module is fastened in a custom made shell part. The custom made part is made according to the measures of the ear canal, and will thus fit each individual, where the module part is mass produced and will not vary from hearing aid to hearing aid. The technique according to the invention is applicable to hearing aids as well as wireless or wired communication devices (headsets, mobile phones, personal agents), loud speakers, tinnitus masking devices, devices recording vibrations in the skull and transforming these into audio signals, voice recognition devices, earplugs, noise blockers with selective frequencies or sound levels, Man Machine Interface (MMI) products that enable clear communication even in the noisiest environments, or products related to wireless Internet applications.

BACKGROUND OF THE INVENTION

In systems of the above kind the custom made shell part is usually made by some sort of rapid prototyping like SLA prototyping. Here, the obtainable precision is not high enough and the material is not strong enough to allow a conventional and reliable snap fit to be produced. Further, it is a problem that very little space is available and at the same time a reliable connection is needed, which will not inadvertently release itself if the hearing aid or audio device is accidentally dropped onto a hard surface or when the user changes the battery.

U.S. Patent Application Publication 2004/0258264 A1 an in-the-ear hearing aid is described wherein the hearing aid comprises a faceplate shaped to match spatial contours of that region of a human pinna to which the aid is designed to interface. The plate is fabricated by stereo lithography. The hearing aid additionally comprises a peripheral frame, and a socket module suitable for insertion into a human's auditory canal. The socket module is adapted to receive an electronic module comprising a microphone for receiving sound at the aid. The peripheral frame and the socket module described in the U.S. Patent Application Publication 2004/0258264 document are additional elements which add to the complexity of the hearing aid and it would be advantageous if the electronic module, the socket module and the peripheral frame were integrated into one and the same element which could be fastened into the custom made part.

Further prior art document WO 2002071794 discloses a hearing aid with a custom made shell part and a module for accommodating the electronics, which is fastened directly into the custom made part. In this document the practical problems relating to the provision of a detachable connection between a custom made shell part and a module are not addressed.

SUMMARY OF THE INVENTION

According to the invention an in-the-ear audio device is provided which comprises a custom made shell part which fits into the ear canal of a user and a pre-fabricated module part, whereby the custom made part has a cavity with an opening for receiving the module wherein two opposing substantially parallel internal walls of the cavity are provided with a distance there between which will allow two external, substantially parallel side elements of the module to slide into the space between the two walls, whereby arch-shaped recesses and beads extend along the walls and the sides such that the module is insertable into the cavity between the two walls by a pivotal movement of the module with respect to the custom made part, whereby the beads slide into respective recesses.

By providing the projections and recesses in arch-shaped form, the forces necessary to maintain the module in place during use may be distributed along the arch-shaped parts, and at the same time the arch-shaped form will help absorb forces both in the length and in the transverse direction. Distribution of forces along the extended surfaces allows the connection to function even in the rather week materials available today for the SLA technique.

The beads may be provided in either the module or in the shell part, and likewise with the recesses. Preferably, arch-shaped projections or beads are provided on both opposing sides of the module; and on the two opposing sides in the opening in the shell part furrows or recesses shaped in a corresponding arch form are provided.

In an embodiment of the invention a snap lock mechanism is further provided such that by the end of the pivotal movement to bring the module in place inside the shell part a resilient part is provided to snap past a further projection.

This locking mechanism locks the module inside the shell part. It is further an advantage to have the locking part separated from the beads and recesses which are otherwise holding the module in place. In this way only a very small locking mechanism is required to hold the module in place, as the locking mechanism in itself is not supposed to withstand any larger forces.

It is further preferred that the resilient part is a tongue provided integrally with the side elements of the module, whereby the resilient tongue is easily provided in injection moulding technique along with other constructional details of the module.

Preferably the resilient tongue part is made to flex in a direction essentially perpendicular to the side element when snapping past the projection. Hereby it becomes especially easy to provide means for blocking the movement of the resilient tongue. Such means may comprise the battery drawer, and in this way the module will be effectively blocked inside the shell.

In an embodiment of the invention a battery compartment is provided in the space between the two sides of the module, and a battery spring for contacting the surfaces of the battery is provided at each side.

The battery is thus accommodated in the module and can easily be arranged such that it is changeable without extraction of the module. Further the embedded springs will aid to stiffen the sides in the module. Also, as explained the battery drawer can easily be made such that it blocks any movement of the resilient tongue part, whereby the module cannot be removed unless the battery drawer is either open or completely removed from the device. The batter drawer may be made in a usual click on fashion.

In a further aspect the invention comprises a method for fastening a module in a cavity in a custom made shell for an in the ear audio device, whereby the custom made shell part is made to fit into the ear canal of a user and where further a pre-fabricated module part is provided to fit into the custom made part inside a cavity whereby the module is initially placed at an opening above the cavity and pivoted around an axis substantially orthogonal to two opposed sides of the module and two corresponding opposed walls of the cavity, whereby the pivotal movement of the module with respect to the custom made part causes retention means at the walls and sides to interact.

According to the method an initial part of the pivotal movement slides arch-shaped beads into corresponding recesses on respective substantially parallel sides of the module and internal walls of the cavity.

In this way a safe and secure retention of the module is provided, as the beads and recesses will distribute possible retention forces along the length of the arc shaped parts.

Further, according to the method a resilient tongue at a wall or side is caused to bend and pass behind a projection in snap lock fashion to lock the module inside the cavity.

With both the retention means in the shape of the corresponding arch-shaped beads and recesses and with the snap locking at the end of the pivotal movement of the module with respect to the custom made part, the module will be secured in the cavity, and further the use of the snap-locking means will allow the module to be re-extracted from the cavity if this is required. This is done by simply forcing the tongue in the opposite direction to free it from the projection and then pivot the module back to a position outside the cavity. Preferably the pivotal movement of the module with respect to the custom made part comprise an arc of no less than 45°, and preferably no more than 90°.

In a further aspect the invention a method for extracting a module from a custom made shell part where the custom made shell part is made to fit into the ear canal of a user and where further a pre-fabricated module part is provided to fit into the custom made part inside a cavity, where the module is retained in the custom made shell part by means of a locking tongue which locks the module in snap locking engagement with the custom made part whereby a tool with a handle part and a connection part is introduced such that the connection part forces the tongue to flex out of the snap locking engagement with the custom made part, whereafter the tool and module retained at the tool parts are moved for bringing the module out of engagement with the custom made part.

By the use of this method it will be a simple and relatively easy task to remove the module from the custom made part. Further, the method ensures that the delicate parts of both custom made part and module are not adversely effected by the handling thereof.

Preferably the movement performed for bringing the module out of engagement with the custom made part is a pivotal movement.

DETAILED DESCRIPTION OF THE PREFERRED EMBODIMENTS

Figure 1:
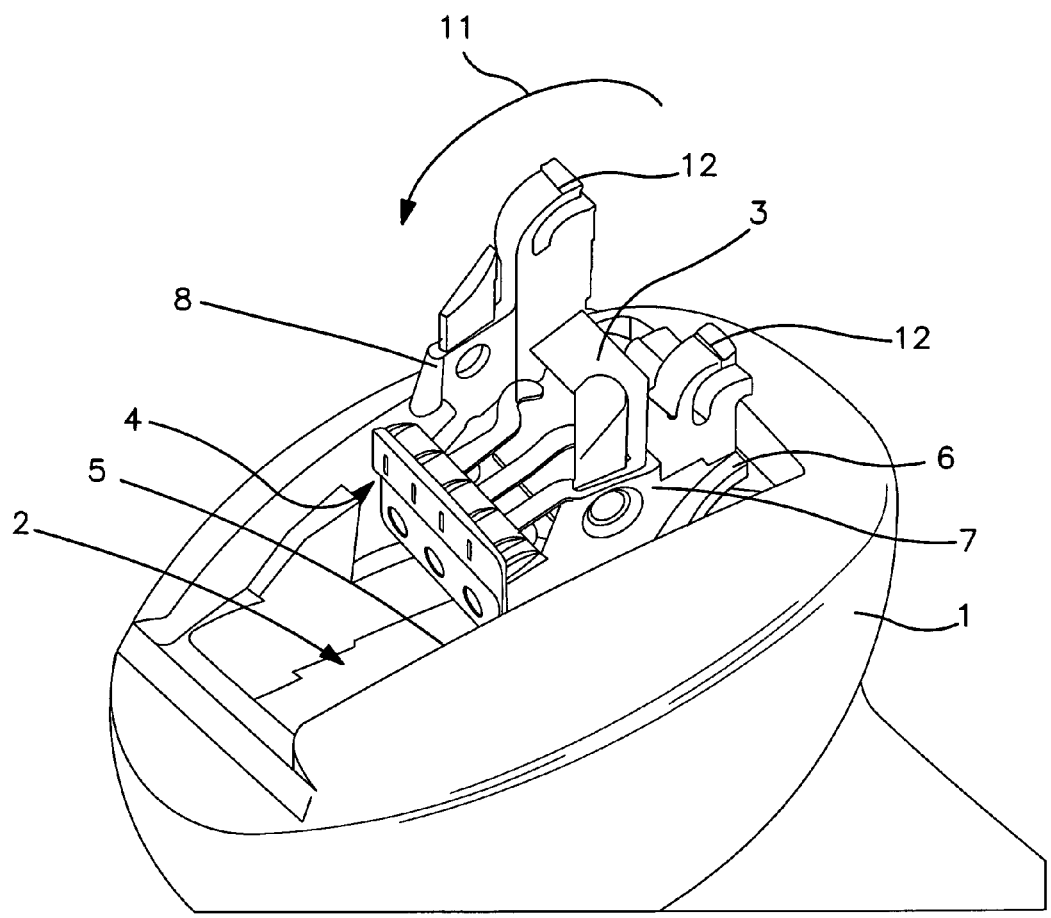
FIG. 1 is a perspective view of the module and the custom made part where the module is ready for insertion.
Figure 2:
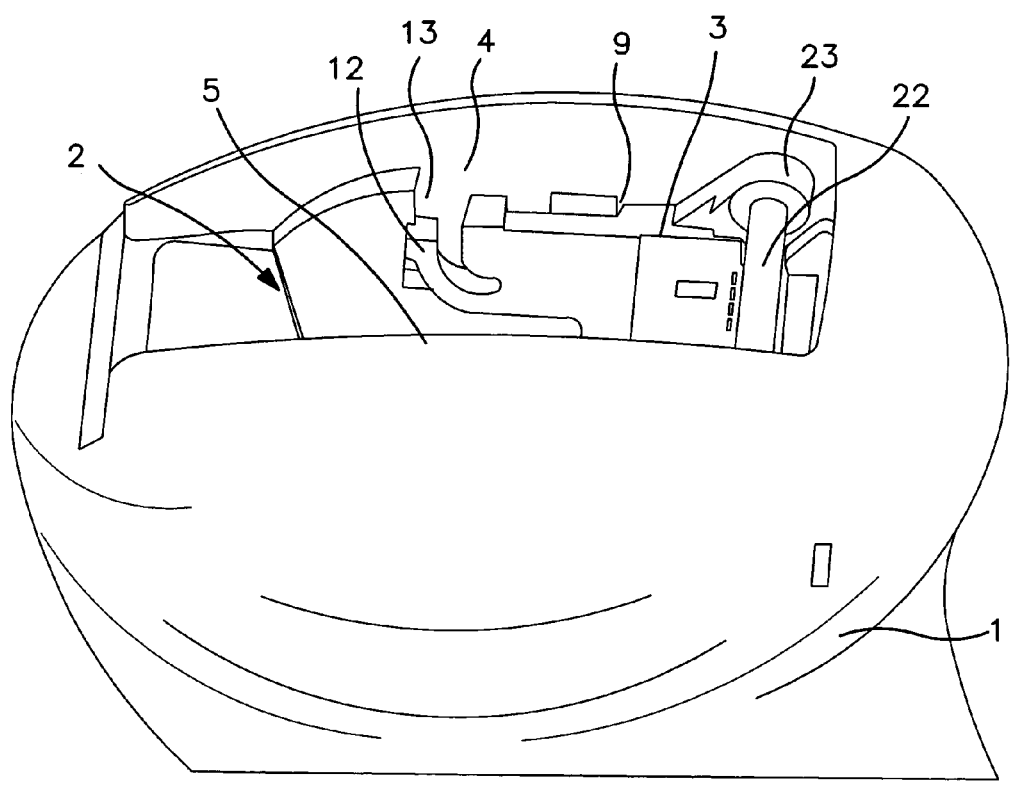
FIG. 2 is a perspective view of the module and custom made part with the module in place in the cavity.
Figure 3:
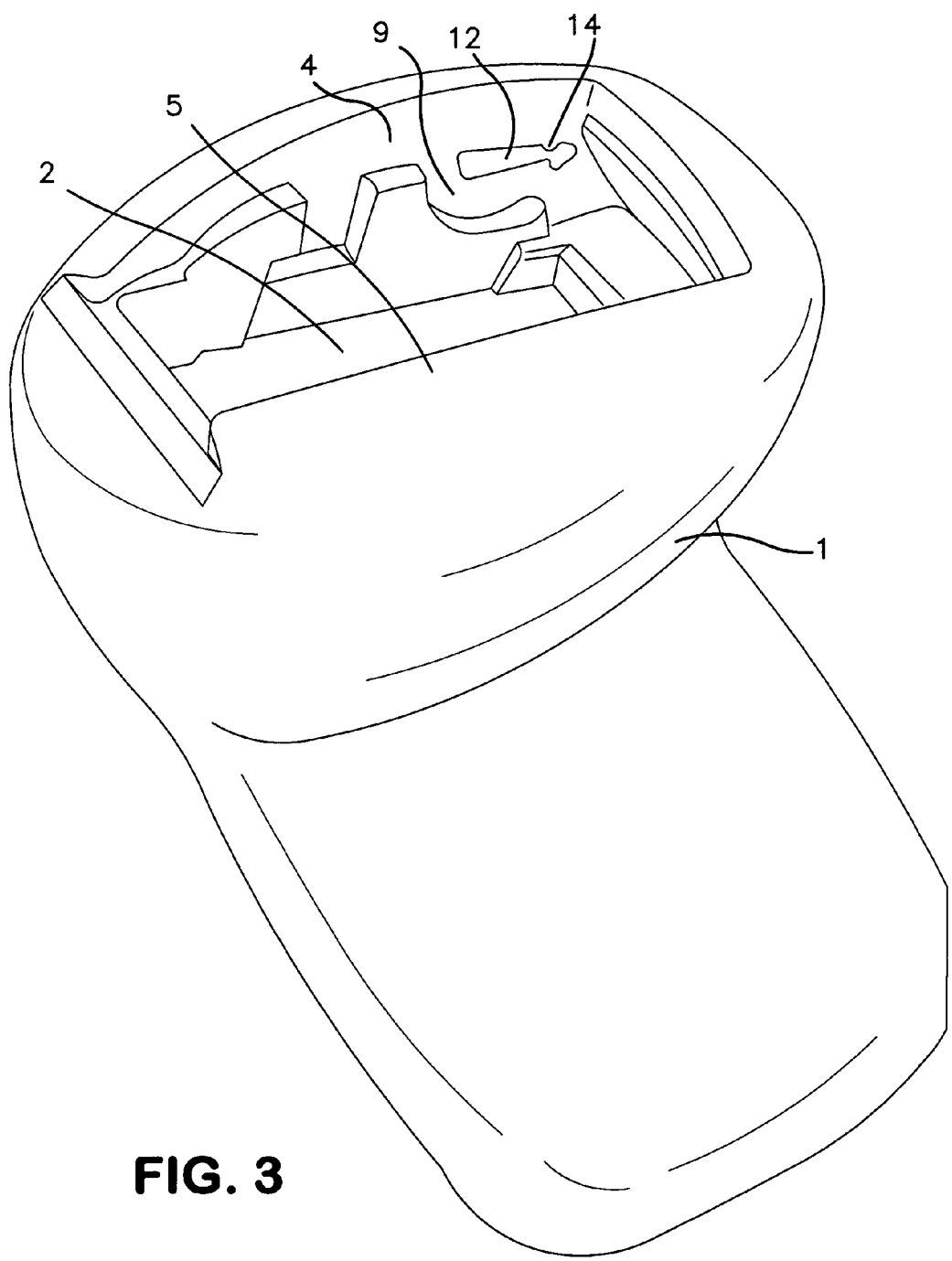
FIG. 3 is a perspective view of the custom made part with the cavity.
Figure 4:
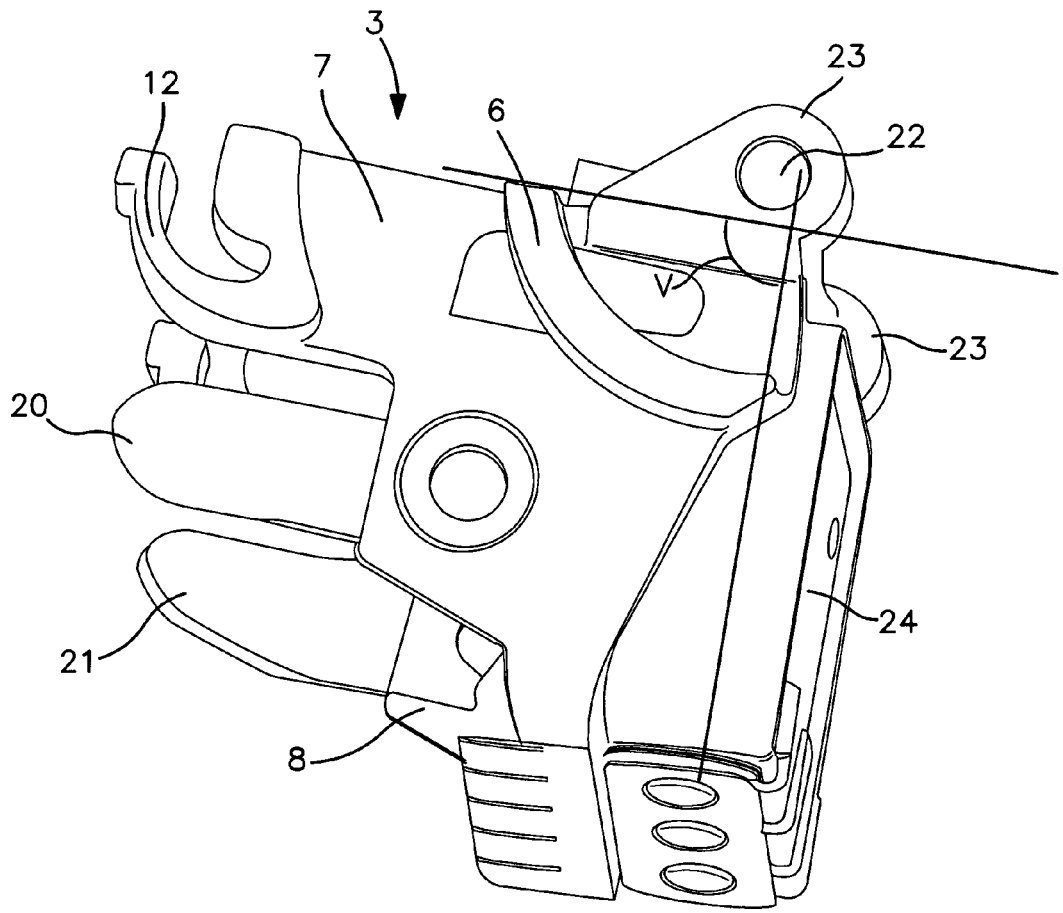
FIG. 4 is a perspective view of the module.

A hearing aid according to the invention is shown in FIG. 2. The custom made part 1 is shown with an opening to a cavity 2 wherein a mass produced module 3 is inserted between two opposed, parallel internal side walls 4, 5. In FIGS. 1 and 4 the module 3 is shown and here an arch-shaped bead 6 is visible on a side element 7 thereof. The arch-shaped bead 6 is mirrored on the other side 8 of the module 3. The custom made shell part 1 is shaped with recesses on the two opposed internal side walls 4, 5 to accommodate the two beads on the sides 7 and 8 of the module. Only one such recess 9 is visible in FIG. 3. In order to bring the module 3 into the cavity 2 between the two walls 4, 5, the module 3 is initially placed as shown in FIG. 1, whereby the beads on each side of the module 3 are placed on top of the recesses in the walls 4,5. By pivoting the module 3 in the direction of the arrow 11 with respect to the custom made part 1, the beads will slide into the recesses and cause the module to be fixed inside the cavity 2 as shown in FIG. 2.

When the module 3 is placed in the opening of the custom made part 1 as shown in FIG. 1, rounded bushing 23 (seen in FIG. 4) will rest in a notch 14 provided in a ledge 12 which forms a part of the cavity 2, and when the module 3 is placed here the bead 6 will automatically be positioned at the entrance of the arch-shaped recess in the internal wall 5, such that the bead 6 will slide along this recess when the module 3 is caused to move pivotally in the notch 14.

In the above described embodiment of the invention the beads 6 are provided on the module 3 and the recesses are in the custom made part 1, but this may also work the other way round, such that the recesses are made as part of the module 3 and the beads are in the custom made part 1. Also, a module with a recess to one side and a bead to the other is possible, provided that the custom made part is made with corresponding beads/recesses.

In order to lock the module 3 in place, a snap lock is further provided as is also seen in FIG. 2. The snap lock comprises a resilient tongue part 12 arranged to flex into place behind a protrusion 13 during the last part of the insertion motion of the module 3. In the displayed embodiment of the invention the resilient tongue 12 is part of the module and the protrusion 13 is made in the custom made part 1. A snap lock made with a flexing part in SLA material may also function, however given the not to high strength of the SLA custom made part. It is advantageous to make the resilient tongue part 12 in the material of the module 3.

The module as shown in FIG. 4 has two battery springs 20, 21 arranged to contact a battery (not shown) which is insertable in the space between the sidewalls 7, 8 of the module 3. The module further comprises a shaft 22 arranged to receive a battery drawer (not shown) possibly in click on fashion. As can be seen in FIG. 4, the shaft 22 is connected to the module through bushings 23 formed in the material of the side walls 6, 7 at each side. Also, a microphone 24 forms part of the module. Possibly signal processing means are also part of the module 3 and connection points for connection with an output transducer in the form of a receiver will be part of the module 3.

As can be seen in FIG. 4, the bead 6 is arranged to span an angle v, which in this embodiment is around 90°. A smaller angle may be used and still allow the module to be fastened in the custom made part 1. Preferably, the angle is no less than 45° in order to secure a stable connection.

Figure 5:
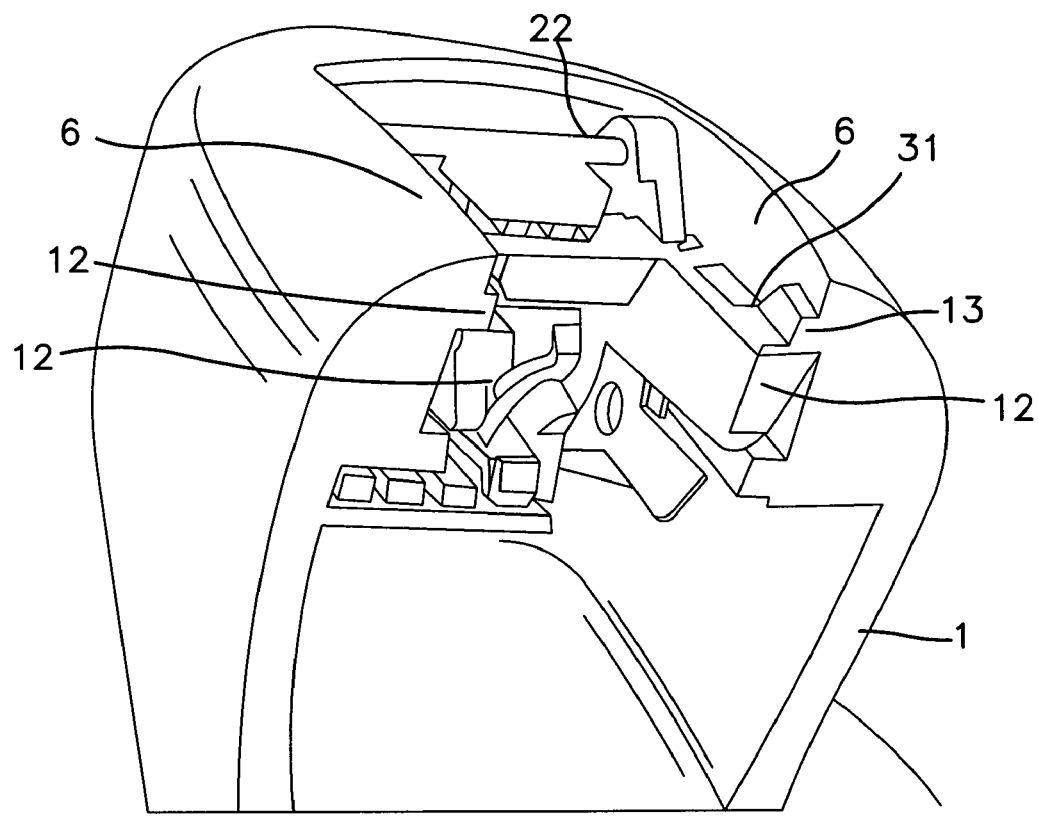
FIG. 5 is a perspective view with a cut-away part of the module inserted in the shell according to a further embodiment of the invention.
Figure 6:
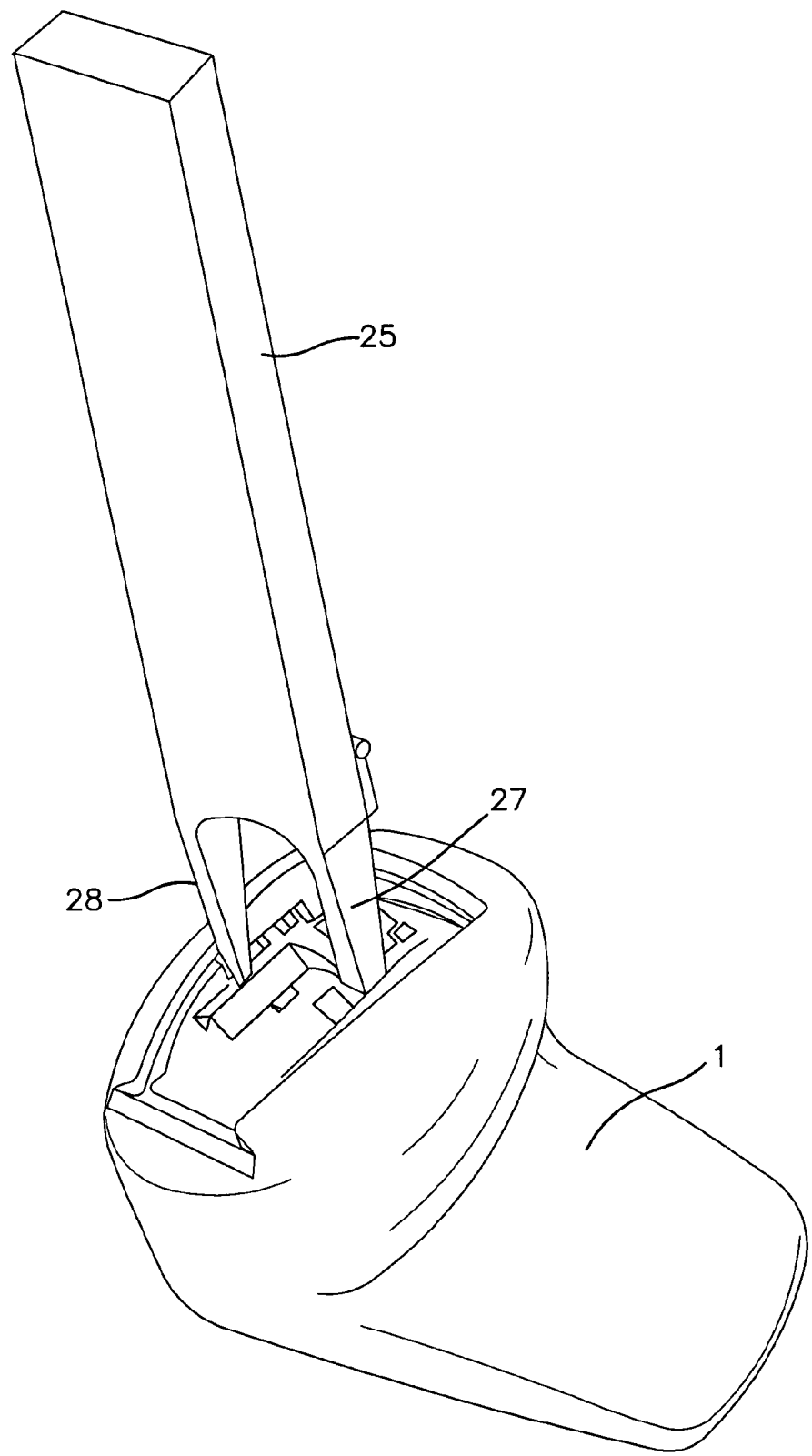
FIG. 6 is a perspective view of the audio device shown in FIG. 5 with a tool of extraction of the module from the custom made part.
Figure 7:
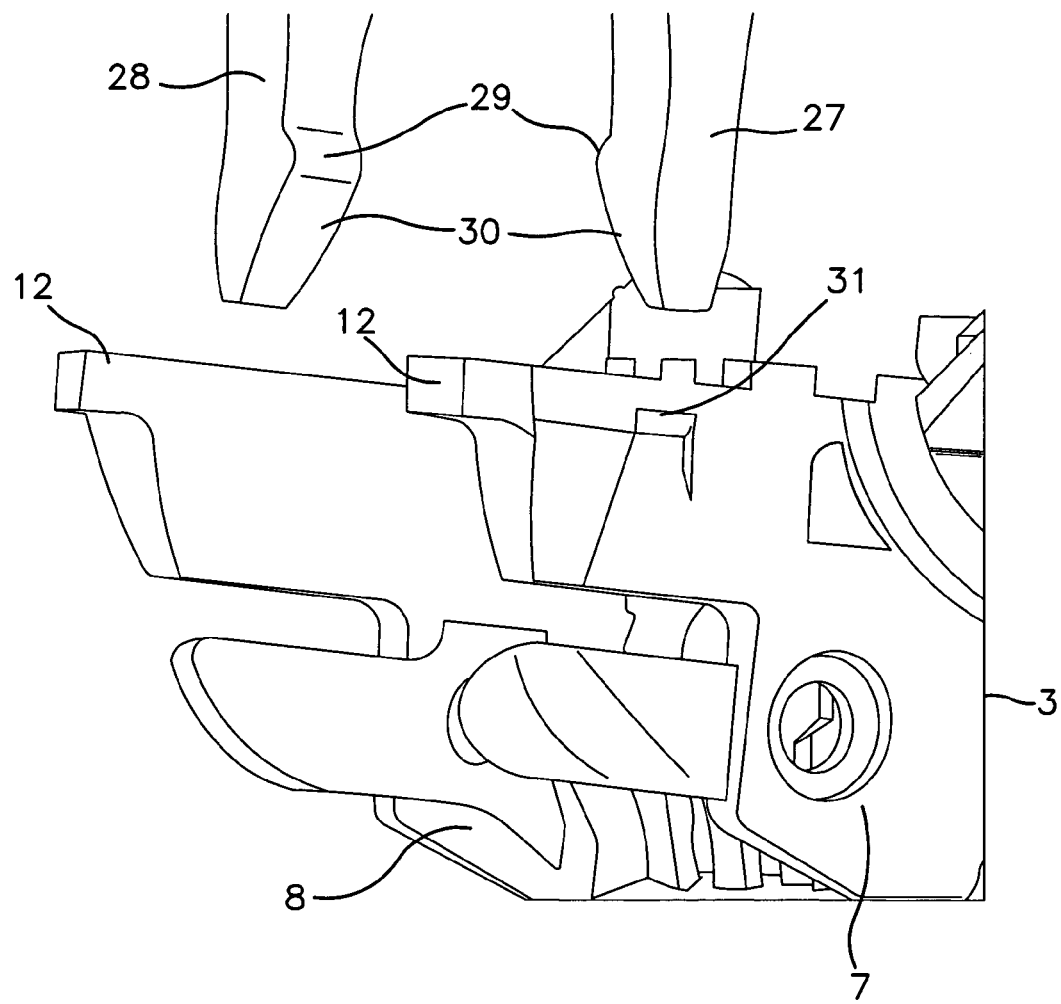
FIG. 7 is an enlarged perspective view of a detail of the module and extraction tool.

In FIGS. 5, 6 and 7 a further embodiment of the invention is displayed wherein the movement of the tongue 12 in and out of the locking position is transversal with respect to the parallel walls 4,5 of the custom made part 1. In this embodiment the tongue 12 at each side will have to move towards the centre-plane of the module 3 during the insertion motion in order to pass the projection 13 at each side. Once inserted the tongues 12 will snap back towards the respective walls 4,5 behind the projections 13. The hearing aid or audio device also needs a power supply and space for accommodating a battery is provided as well as a shaft 22 whereto a battery drawer may be fastened in usual click on fashion. A battery drawer (not shown) is rotated it may be designed to block the movement snap locking tongues at the side elements 7,8 of the module 3.

In order to extract the module 3 from the custom made part 1, a forked tool 25 can advantageously be used as displayed in FIG. 6. The two forks 27, 28 of the tool each comprise projections 29 which are turned towards each other. The forked tool 25 is inserted such that the two tongues 12 are embraced, and due to inclined surfaces 30 of the forks 27,28, the tongues 12 will be forced to flex in a direction towards each other and thus be moved free of the protrusions 13 at the walls of the custom made part 1. Recesses in the wall parts of the custom made part are provided to allow the forks 27,28 to be inserted as described above, and further as seen in FIG. 7 a recess 31 is provided in each tongue 12 for accommodating the projections 26 of the forked tool. With the projections 29 inserted in recesses 31, the module may easily be pivoted by swinging the handle part 25, whereby the module 3 end op as shown in FIG. 1 wherefrom it may be lifted away from the custom made part.

The invention claimed is:

1. An in-the-ear audio device which comprises:
   a custom made shell part which can fit within an ear canal of a user, said custom made shell part having a cavity with substantially parallel side walls, and an opening to said cavity, and
   a pre-fabricated module part which has substantially parallel side walls and can be positioned within the cavity of said shell part,
   a first of said shell part and module part including recesses in the side walls thereof which extend along an arc-shaped curve in parallel with the respective side walls thereof, said recesses spanning an angle of at least 45°, and a second of said shell part and module part including beads which extend along an arc-shaped curve in parallel with the respective side walls thereof, said beads spanning an angle of at least 45°, such that the module part can be inserted through said opening and pivoted into position within the cavity of said shell part by relative movement between said beads and said recesses.

2. The in-the-ear audio device as claimed in claim 1, including a snap lock mechanism comprising a resilient part and a projection such that by the end of the pivotal movement of the module inside the shell part, the resilient part will snap past the projection.

3. The in-the-ear audio device as claimed in claim 2, wherein the resilient part is a tongue provided integrally with side elements of the module.

4. The in-the-ear audio device as claimed in claim 3, wherein the resilient tongue part is made to flex in a direction essentially perpendicular to the side element when snapping past the projection.

5. The in-the-ear audio device as claimed in claim 1, wherein space between the two side elements of the module is provided for accommodation of a battery, and including battery springs for contacting the surfaces of the battery at each side element.

6. A method for fastening a module in a cavity in a custom made shell for an in-the-ear audio device, whereby the custom made shell part is made to fit into the ear canal of a user and where further a pre-fabricated module part is provided to fit into the custom made part inside a cavity thereof, the cavity having two internal, substantially parallel side walls and the module part having two substantially parallel outer side walls, the method comprising the steps of providing recesses in side walls of a first of said cavity and said module part so as to extend along an arc-shaped curve, providing beads in side walls of a second of said cavity and said module part so as to extend along an arc-shaped curve, positioning the module part at an opening to the cavity, and pivoting the module part around an axis which extends substantially orthogonal to the two side walls of the module part, whereby said recesses and beads will engage to position the module within the cavity.

7. The method as claimed in claim 6, wherein an initial part of the pivotal movement slides arc-shaped beads at the side walls of the module part along arc-shaped recesses in the internal walls of the cavity.

8. The method as claimed in claim 6, wherein a resilient tongue at a wall or side is caused to bend and pass behind a projection in snap lock fashion to lock the module part inside the cavity.

9. The method as claimed in claim 6, wherein the pivotal movement of the module part with respect to the custom made part comprise an arc of no less than 45° and no more than 90°.

* * * * *